UNITED STATES PATENT OFFICE.

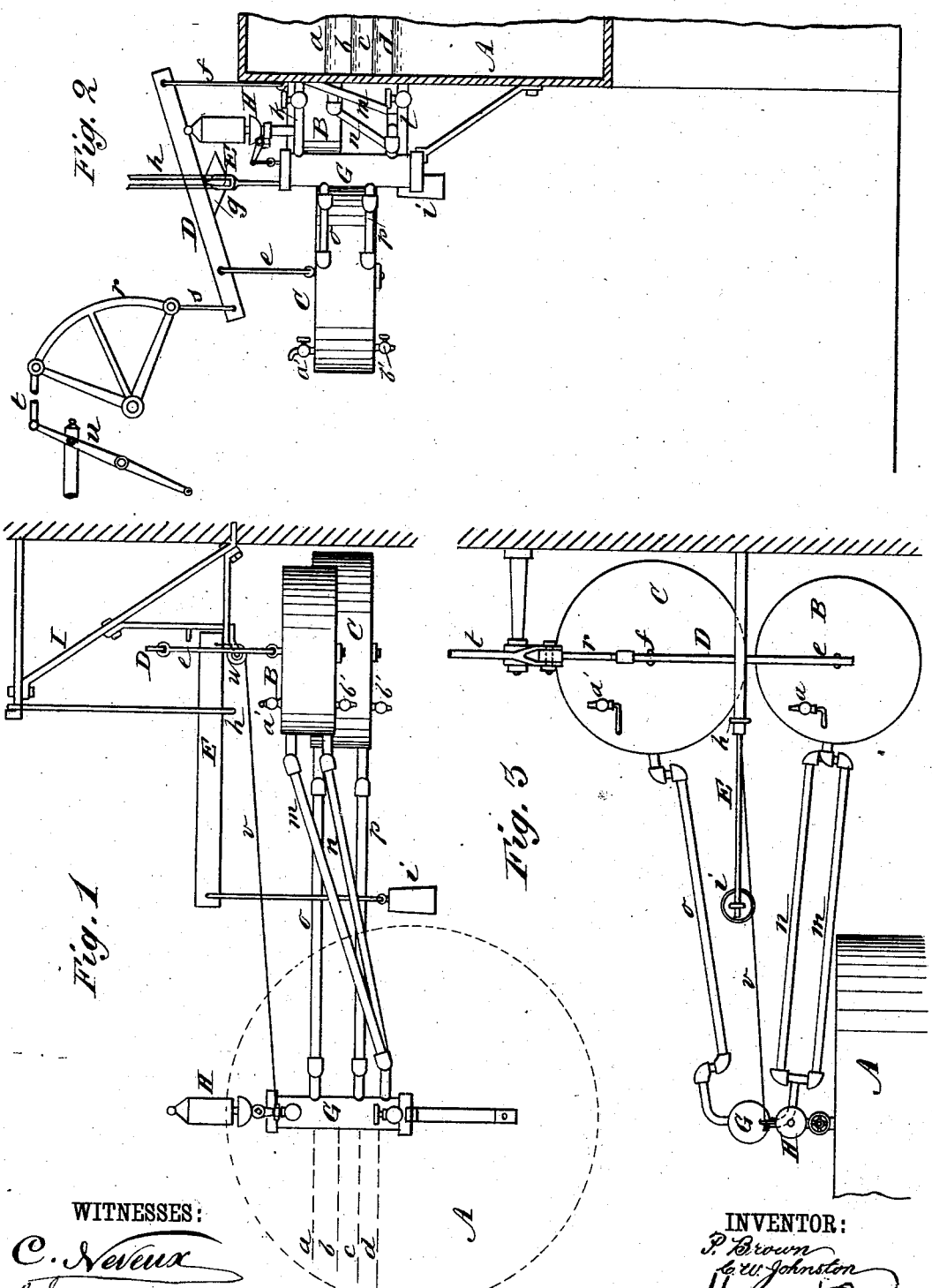

PATRICK BROWN AND CHARLES W. JOHNSTON, OF PHILADELPHIA, PA.

FEED-WATER REGULATOR AND ALARM.

SPECIFICATION forming part of Letters Patent No. 292,455, dated January 22, 1884.

Application filed July 3, 1883. (No model.)

*To all whom it may concern:*

Be it known that we, PATRICK BROWN, of Chestnut Hill, in the city and county of Philadelphia and State of Pennsylvania, and CHARLES W. JOHNSTON, of Germantown, in the city and county of Philadelphia, and State of Pennsylvania, have invented certain new and useful Improvements in Feed-Water Regulators and Alarms for Steam-Boilers, of which the following is a full, clear, and exact description.

This invention has for its object the production of a combined feed-water regulator and low-water alarm for steam-boilers which shall be both simple and efficient; and it consists in certain combinations of parts or devices making up an apparatus of novel construction, including a feed-water-regulating cylinder or vessel and an alarm cylinder or vessel connected by flexibly-jointed pipes with the steam and water spaces of the boiler, or with a receptacle attached thereto, and carried by or on opposite ends of a beam which rocks upon a secondary weighted beam, whereby, according to the amount or deficiency of water in said cylinders, the feed or supply of water to the boiler is automatically regulated and, in the event of the water falling dangerously low in the boiler, the whistle is sounded, substantially as hereinafter described.

Reference is to be had to the accompanying drawings, forming part of this specification, in which similar letters of reference indicate corresponding parts in all the figures.

Figure 1 represents a side elevation of the apparatus, as seen from the end of a steam-boiler, which is shown in dotted lines. Fig. 2 is an elevation of the same at right angles to Fig. 1, and showing the end portion of the boiler in section; and Fig. 3, a plan view of the apparatus and boiler in part.

A is a steam-boiler, and the lines *a b c d* indicate different water-levels in the boiler, to illustrate the action of the apparatus, the line *a* representing the highest water-level, the line *b* the medium level, the line *c* the low-water level, and the line *d* a still lower or dangerous water-level.

B C are two close vessels or cylinders, suspended by rods *e f* from a beam, D, on opposite sides of its fulcrum. These cylinders, if arranged at like distances from the fulcrum of the beam which carries them, should be made of different sizes. Thus the cylinder C should have twice the area or capacity of the cylinder B, or thereabout, so that when the cylinder C is only half-full of water it will balance the cylinder B when full of water. The fulcrum of the beam D is arranged on or near the end of another beam, E, which works on a fixed fulcrum, *h*. The opposite end of the beam E to that on which the beam D rocks has attached to it a weight, *i*, the function of which will be hereinafter described.

G is a receptacle or close upright pipe, connected above and below by branches *k l* with the steam and water spaces of the boiler. This receptacle G is connected at different elevations by flexibly-jointed pipes *m n o p* with the upper and lower portions of the cylinders B C—as, for instance, the cylinder B, which is the alarm one, is connected above and below by the flexibly-jointed pipes *m n* with the receptacle G at or about the lowest or danger water line or level, *d*, while the cylinder C, which is the feed-regulating one, is connected above and below by the flexibly-jointed pipes *o p* with the receptacle G at or about the highest water line or level, *a*, and low-water line or level *c*.

The flexibly-jointed connection of the pipes *m n o p* provides for a rising and falling motion of the vessels or cylinders B C. The cylinder C will be about half-full of water when the level of the water in the boiler is at its medium height, as indicated by the line *b*. Supposing the capacity of said cylinder to be equal to forty (40) pounds, then the weight of water therein will be twenty (20) pounds. The alarm-cylinder B, connecting both above and below with the receptacle G at or about the lowest or danger water-level, *d*, in the boiler, will then and at all times, excepting when sounding the alarm, be kept full of water by the pressure of steam in the boiler, and will balance the cylinder C when only half-full. Of course, the relative proportions of the vessels or cylinders B C may be varied by varying their leverage-connections with the beam D; but the proportions and capacities stated will here suffice for the purpose of illustrating the operation of the apparatus. Accepting these proportions and capacities, as the water in the boiler falls below the medium level, $b$, to the low level, $c$, or sufficiently to empty the feed-regulating cylinder C of water, then the preponderance of the cylinder C will be equal to about twenty (20) pounds. This causes the alarm-cylinder B to fall and the cylinder C to rise, and the beam D, by means of crank-rod and lever connections $r$, $s$, $t$, and $u$, or by any other suitable mechanism, to operate the injector, pump, or cock connected with the water-supply pipe, so as to supply or feed water to the boiler. When, however, the water has risen to its highest level, $a$, in the boiler, the upper pipe, $o$, will then be immersed at its connection with the receptacle G, and the pressure of the steam in the boiler, acting upon the surface of the water, will cause the cylinder C to become overloaded or full of water. This will cause the cylinder C to be twenty (20) pounds (more or less) heavier than the cylinder B, and consequently to fall, and in its operation of the beam D will cause the mechanism connected therewith for controlling the water-supply to be actuated so as to shut off any further supply of water to the boiler. In case the supply of water fails from any cause, so as to fall to the lowest safe water-level, $c$, or below it, then the cylinder C will be emptied of water, and as the water continues to descend to or toward the danger-level $d$, or slightly below it, so as to bring the connection of the receptacle G with the pipes which lead to the cylinder B a little below the level of the water in the boiler, so as to allow steam to pass from the boiler into the cylinder B, then said cylinder B will also be emptied of water. This will remove so much weight from the end of the beam E, on which the beam D, carrying the cylinders B C, rests, as to cause the weight $i$ to tip the beam E, and, by a wire-and-chain connection, $v$, with the beam E, passing over a pulley, $w$, and attached to the opening and closing lever of a steam-whistle, H, will cause the whistle to be sounded, and so call attention to the dangerous level of the water in the boiler. A rest, $g$, is arranged on the beam E, to support the beam D, and so prevent either cylinder B C from falling too low in the operation of the apparatus.

The apparatus may be arranged, as shown, mainly in front of one end of the boiler, and be suspended from a bracket, I, in the wall of the boiler-room, or from its ceiling; or it may be arranged in any part of the boiler-room where most out of the way, so long as it is at the proper height for operation, as described.

To attach the apparatus to the boiler, it is only necessary to tap two holes in the boiler for the branches $k$ $l$ of the receptacle G. These pipes are provided with stop-cocks for shutting off connections in case the apparatus needs repair. In this apparatus there is no danger of the whistle, after it has been blowing a short period, filling with water or blowing water.

The cylinders B C should be fitted on their tops with cocks $a'$, to provide for the escape of air, and with other cocks, $b'$, in their bottoms, for blowing off any mud that may collect in the cylinders.

We do not abandon or dedicate to the public any patentable feature set forth herein and not hereinafter claimed, but reserve the right to claim the same either in a reissue of any patent that may be granted upon this application or in other applications for Letters Patent that we may make.

Having thus described our invention, what we claim as new, and desire to secure by Letters Patent, is—

1. In a feed-water regulator for steam-boilers, the combination, with mechanism for opening and shutting off the supply of feed-water to the boiler, of unequally-preponderating water cylinders or vessels on opposite ends or arms of a rocking beam, and flexibly-jointed pipes connecting the upper and lower portions of said cylinders or vessels with the steam and water space of the boiler at different altitudes, substantially as specified.

2. In a combined feed-water regulator and low-water alarm for steam-boilers, the combination, with mechanism for opening and shutting off the supply of feed-water to the boiler, and with a steam whistle or alarm and connections for operating it, of unequally-preponderating water cylinders or vessels on opposite sides or arms of a rocking beam, flexibly-jointed pipes connecting the upper and lower portions of said cylinders or vessels with the steam and water space of the boiler at different altitudes, and a weighted rocking beam, on the one arm of which the beam carrying said cylinders or vessels has its fulcrum, essentially as and for the purposes herein set forth.

3. The combination, with the steam and water receptacle G, arranged to connect with the steam and water spaces of a boiler, of the flexibly-jointed pipes $m$ $n$ $o$ $p$, the unequally-preponderating water cylinders or vessels B C, the beam D, with connections on opposite sides of its fulcrum for carrying said cylinders or vessels, the weighted beam E, having a fixed fulcrum, $h$, and supporting on its lighter end or arm the beam D, and mechanism or devices connected with said beams D and E, for opening and shutting off the supply of feed-water to the boiler and for operating a whistle or alarm, substantially as specified.

4. The bracket I and attached fulcrum $h$, in combination with the weighted beam E, the beam D, arranged to rock on said beam E, and the unequally-preponderating water cylinders or vessels B C, attached to the beam D, for operation in connection with a steam-boiler, essentially as and for the purposes described.

5. The rest $g$ on the weighted beam E, having a fixed fulcrum, in combination with the rocking beam D, mounted on said beam E, and the unequally-preponderating water cylinders or vessels B C, essentially as and for the purposes herein described.

PATRICK BROWN.
CHARLES W. JOHNSTON.

Witnesses:
MICHAEL MCNAMEE,
GEO. R. KRICKBAUM.